(12) United States Patent
Darin et al.

(10) Patent No.: US 10,401,937 B2
(45) Date of Patent: Sep. 3, 2019

(54) METHOD AND APPARATUS FOR DETECTION OF BATTERY DRAIN

(71) Applicant: GM GLOBAL TECHNOLOGY OPERATIONS LLC, Detroit, MI (US)

(72) Inventors: Matthew Darin, Lake Orion, MI (US); Sandeep Menon, Rochester Hills, MI (US); Muralikrishnan Kailasam, Troy, MI (US); Shengbing Jiang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 223 days.

(21) Appl. No.: 15/432,450

(22) Filed: Feb. 14, 2017

(65) Prior Publication Data
US 2018/0232037 A1    Aug. 16, 2018

(51) Int. Cl.
| | |
|---|---|
| G06F 1/32 | (2019.01) |
| B60L 58/10 | (2019.01) |
| G06F 1/3212 | (2019.01) |
| G06F 3/06 | (2006.01) |
| G07C 5/08 | (2006.01) |
| G07C 5/00 | (2006.01) |

(52) U.S. Cl.
CPC ........... *G06F 1/3212* (2013.01); *B60L 58/10* (2019.02); *G06F 3/065* (2013.01); *G06F 3/0619* (2013.01); *G06F 3/0685* (2013.01); *G07C 5/0816* (2013.01); *G07C 5/008* (2013.01); *G07C 5/085* (2013.01)

(58) Field of Classification Search
None
See application file for complete search history.

(56) References Cited

U.S. PATENT DOCUMENTS

| | | | |
|---|---|---|---|
| 8,452,352 B2 | 5/2013 | Kothari et al. | |
| 8,818,617 B2 | 8/2014 | Miller et al. | |
| 2010/0179723 A1 | 7/2010 | Zhang et al. | |
| 2011/0080350 A1* | 4/2011 | Almalki | G06F 3/0414 345/173 |
| 2014/0039720 A1* | 2/2014 | Talbot | B60R 16/0232 701/1 |
| 2014/0095089 A1* | 4/2014 | Wu | G01R 31/3624 702/63 |
| 2014/0173036 A1 | 6/2014 | Das | |
| 2014/0343831 A1 | 11/2014 | Hosey et al. | |

(Continued)

*Primary Examiner* — Danny Chan

(57) ABSTRACT

A method and apparatus detecting battery drain are provided. The method includes: collecting critical data parameters from a plurality of electronic controller units (ECUs); identifying at least one ECU that is active from among the plurality of ECUs based on the critical data parameters and storing ECU snapshot data of the identified at least one ECU; determining an activity of the identified at least one ECU based on the ECU snapshot data and the critical data parameters; determining battery drain information based on at least one from among the ECU snapshot data, the critical data parameters, the activity of the identified at least one ECU, current draw information and fleet information; and outputting determined battery drain information. The method may be used to determine and isolate a root cause of battery drain by analyzing messages over a vehicle network.

15 Claims, 5 Drawing Sheets

(56) References Cited

U.S. PATENT DOCUMENTS

| | | | |
|---|---|---|---|
| 2014/0350779 A1* | 11/2014 | Yasue | G01M 17/00 |
| | | | 701/32.8 |
| 2016/0032858 A1* | 2/2016 | Kim | F02D 41/042 |
| | | | 701/102 |
| 2016/0059807 A1* | 3/2016 | Iwasaki | B60R 16/03 |
| | | | 307/10.1 |
| 2016/0086390 A1* | 3/2016 | Berkobin | G07C 5/008 |
| | | | 701/1 |
| 2017/0153282 A1* | 6/2017 | Du | G01R 31/007 |

\* cited by examiner

METHOD AND APPARATUS FOR DETECTION OF BATTERY DRAIN

INTRODUCTION

Apparatuses and methods consistent with exemplary embodiments relate to detecting a source of battery drain using software-based solutions. More particularly, apparatuses and methods consistent with exemplary embodiments relate to identifying electronic controller units (ECUs) that are the cause of battery drain condition

SUMMARY

One or more exemplary embodiments provide a method and an apparatus that detect battery drain by identifying ECUs that improperly start up and shut down by monitoring vehicle parametric data. More particularly, one or more exemplary embodiments provide a method and an apparatus that detect battery drain by identifying ECUs that improperly start up and shut down based on patterns in vehicle parametric data analyzed in vehicles and among fleets of vehicles.

According to an aspect of an exemplary embodiment, a method for detecting battery drain is provided. The method includes collecting critical data parameters from a plurality of electronic controller units (ECUs), identifying at least one ECU that is active from among the plurality of ECUs based on the critical data parameters and storing ECU snapshot data of the identified at least one ECU, determining an activity of the identified at least one ECU based on the ECU snapshot data and the critical data parameters, determining battery drain information based on at least one from among the ECU snapshot data, the critical data parameters, the activity of the identified at least one ECU, current draw information and fleet information, and outputting determined battery drain information.

The storing ECU snapshot data of the identified at least one ECU may include storing the ECU snapshot data of first time stamped events of the identified at least one ECU, if the critical data parameters of the identified ECU indicate the identified at least one ECU is awake longer a predetermined threshold time; and storing the ECU snapshot data of second time stamped events of the identified at least one ECU if the critical data parameters of the identified ECU indicate active wakeups are present in the ECU or a wakeup frequency is more than a predetermined threshold wakeup frequency. The first time stamped events may include at least one from among a function preventing ECU shutdown and information on a root cause of prevention of ECU shutdown, and the second time stamped events may include at least one from among information on a wakeup event source and information on a root cause of wakeup event.

The collecting the critical data parameters may include: starting normal battery usage range timer after determining that a power mode has transitioned to a power off setting; and in response to the normal battery usage timer elapsing, performing: storing the critical data parameters snapshot for an ECU from among the plurality of ECUs in response to determining that the ECU wakeup is active; storing the critical data parameters snapshot for an ECU and decrementing a shutdown sequence monitor counter in response to determining that a shutdown prevention event for the ECU is active; and restarting a normal battery usage timer in response to the shutdown sequence monitor counter being greater than zero.

The critical data parameters may include at least one from among information on a power mode state, information on a time synch message, information on a diagnostic trouble code with a timestamp logged within ECU, information on a shutdown inhibit notification within an ECU for active software functions, information on memory faults, information on input/output logical states received by microprocessor, information on battery voltage measured at an ECU, information on temperature at an ECU, vehicle identification information, and information on battery voltage, current or charge.

The fleet information may include at least one from among battery drain information, driver behavior information, vehicle age information, and environmental information, of other vehicles in a fleet of vehicles.

The current draw information may include information on a current draw of vehicle derived from intelligent battery service data.

The activity of the identified at least one ECU may include current and historical activity of the identified at least one ECU.

The battery drain information may include at least one from among information on an ECU where a battery discharge is detected, information on whether a cause of a detected battery drain of a vehicle is external or internal to an ECU, and information identifying a cause of a battery drain.

According to an aspect of another exemplary embodiment, an apparatus that detects battery drain is provided. The apparatus includes: at least one memory comprising computer executable instructions; and at least one processor configured to read and execute the computer executable instructions. The computer executable instructions cause the at least one processor to: collect critical data parameters from a plurality of electronic controller units (ECUs), identify at least one ECU that is active from among the plurality of ECUs based on the critical data parameters and store ECU snapshot data of the identified at least one ECU, determine an activity of the identified at least one ECU based on the critical data parameters, determine battery drain information based on at least one from among the ECU snapshot data, the critical data parameters, the activity of the identified at least one ECU, current draw information and fleet information, and output determined battery drain information.

The computer executable instructions may further cause the at least one processor to store ECU snapshot data of the identified at least one ECU by: storing the ECU snapshot data of first time stamped events of the identified at least one ECU, if the critical data parameters of the identified ECU indicate the identified at least one ECU is awake longer a predetermined threshold time; and storing the ECU snapshot data of second time stamped events of the identified at least one ECU if the critical data parameters of the identified ECU indicate active wakeups are present in the ECU or a wakeup frequency is more than a predetermined threshold wakeup frequency. The first time stamped events may include at least one from among a function preventing ECU shutdown and information on a root cause of prevention of ECU shutdown, and the second time stamped events may include at least one from among information on a wakeup event source and information on a root cause of wakeup event.

The computer executable instructions may further cause the at least one processor to collect the critical data parameters by: starting normal battery usage range timer after determining that a power mode has transitioned to a power off setting, and in response to the normal battery usage timer elapsing, performing: storing the critical data parameters snapshot for an ECU from among the plurality of ECUs in response to determining that the ECU wakeup is active; storing the critical data parameters snapshot for an ECU and decrementing a shutdown sequence monitor counter in response to determining that a shutdown prevention event for the ECU is active; and restarting a normal battery usage timer in response to the shutdown sequence monitor counter being greater than zero.

The critical data parameters may include at least one from among information on a power mode state, information on a time synch message, information on a diagnostic trouble code with a timestamp logged within ECU, information on a shutdown inhibit notification within an ECU for active software functions, information on memory faults, information on input/output logical states received by microprocessor, information on battery voltage measured at an ECU, information on temperature at an ECU, vehicle identification information, and information on battery voltage, current or charge.

The fleet information may include at least one from among battery drain information, driver behavior information, vehicle age information, and environmental information, of other vehicles in a fleet of vehicles.

The current draw information may include information on a current draw of vehicle derived from intelligent battery service data.

The activity of the identified at least one ECU may include current and historical activity of the identified at least one ECU.

The battery drain information may include at least one from among information on an ECU where a battery discharge is detected, information on whether a cause of a detected battery drain of a vehicle is external or internal to an ECU, and information identifying a cause of a battery drain.

According to an aspect of another exemplary embodiment, a non-transitory computer readable medium comprising computer executable instructions executable by a processor to perform the method for detecting battery drain. The method includes starting normal battery usage range timer after determining that a power mode has transitioned to a power off setting, in response to the normal battery usage timer elapsing, performing: storing the critical data parameters snapshot for an ECU from among the plurality of ECUs in response to determining that the ECU wakeup is active; storing the critical data parameters snapshot for an ECU and decrementing a shutdown sequence monitor counter in response to determining that a shutdown prevention event for the ECU is active; and restarting a normal battery usage timer in response to the shutdown sequence monitor counter being greater than zero.

The critical data parameters may include at least one from among information on a power mode state, information on a time synch message, information on a diagnostic trouble code with a timestamp logged within ECU, information on a shutdown inhibit notification with ECU for active software functions, information on memory faults, information on input/output logical states received by microprocessor, information on battery voltage measured at an ECU, information on temperature at an ECU, vehicle identification information, and information on battery voltage, current or charge.

Other objects, advantages and novel features of the exemplary embodiments will become more apparent from the following detailed description of exemplary embodiments and the accompanying drawings.

DETAILED DESCRIPTION

Figure 1:
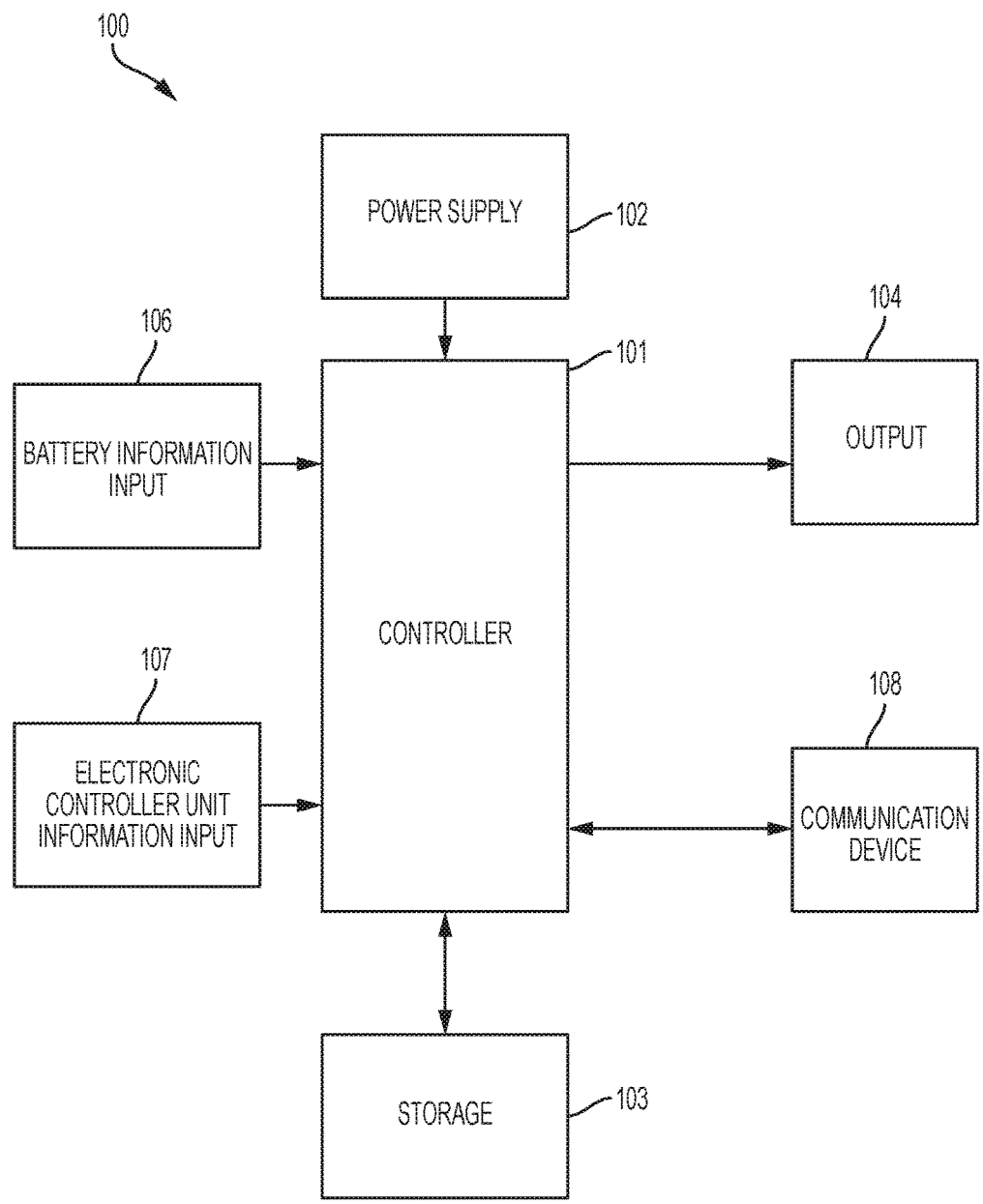
FIG. 1 shows a block diagram of an apparatus that detects battery drain according to an exemplary embodiment.

An apparatus and method that detect battery drain will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or combined into one or more devices. In addition, individual elements may be provided on separate devices.

Electronic controller units (ECUs) control operations of various components of vehicles such as passenger cars, motorcycles, trucks, sports utility vehicles (SUVs), recreational vehicles (RVs), marine vessels, aircraft, etc. Depending on the state of a vehicle an ECU may be active or inactive, e.g., sleeping or in a low power consumption mode. For example, if the vehicle engine is not running, an ECU that controls the engine may be inactive. However, an ECU that controls access to the vehicle may be active because ingress and egress to/from a vehicle may still be required when the engine is not running.

An ECU that is not active or not required to be active may be placed into a sleep mode, thereby reducing battery current draw caused by the ECU and minimizing impact to the retained charge on the battery. The ECU may receive an internal or external wake up event and enter into an active mode on demand if a function that requires the ECU is being performed at the vehicle level. Often times, a malfunction in an ECU or a component communicating with the ECU keeps the ECU awake or active even when it is not required to be active, resulting in a "battery drain event." It is also possible that if the ECU is active for a short duration, the battery discharge, while significant, may still not result in a battery drain event. For example, ECUs may still be able to operate in low power mode and also support vehicle start conditions.

To address the issue of undesired battery discharge, one method of diagnosing battery discharge involves pulling individual fuses to isolate and identify a malfunctioning ECU or component causing battery drain. Another method of diagnosing battery discharge involves storing and analyzing ECU internal parametric data to detect patterns of information that indicate improper activity by an ECU or component within a vehicle before the battery discharge results in a "battery drain event". Analyzing stored information in an ECU, may allow for retroactively analyzing the vehicle for the cause of the battery drain event after it has occurred. Yet another method of diagnosing battery drain may include analyzing messages or events on vehicle networks, such as a controller area network, and detecting a pattern, component or ECU that is causing a battery drain.

A "battery drain event" may be an even where the drain of battery power falls below the threshold needed to support vehicle functionality. For example, a battery drain event may be a final step in the battery discharge condition due to behavior by ECUs, hardware Failure, etc., that draws an undesirable amount of current thereby depleting the battery charge needed to enable vehicle start conditions. The battery drain event in a vehicle may result in a need to jump start vehicles. Conversely, if battery drain event has not been occurred, it may still possible to start the vehicle from a vehicle ignition off condition. By design, a battery drain event should not be reached, except due to an anomaly or a hardware failure condition.

FIG. 1 shows a block diagram of an apparatus for detecting battery drain 100 according to an exemplary embodiment. As shown in FIG. 1, the apparatus for detecting battery drain 100, according to an exemplary embodiment, includes a controller 101, a power supply 102, a storage 103, an output 104, a battery information input 106, an ECU information input 107, and a communication device 108. However, the apparatus for detecting battery drain is not limited to the aforementioned configuration and may be configured to include additional elements and/or omit one or more of the aforementioned elements. The apparatus for detecting battery drain 100 may be implemented as part of a vehicle or as a standalone component.

The controller 101 controls the overall operation and function of the apparatus for detecting battery drain 100. The controller 101 may control one or more of a storage 103, an output 104, a battery information input 106, an ECU information input 107, and a communication device 108 of the apparatus for detecting battery drain 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the battery information input 106, the ECU information input 107, and the communication device 108 of the apparatus for detecting battery drain 100. The information may be sent and received via a bus or network, or may be directly read or written to/from one or more of the storage 103, the output 104, the battery information input 106, the ECU information input 107, and the communication device 108 of the apparatus for detecting battery drain 100. Examples of suitable network connections include a controller area network (CAN), a media oriented system transfer (MOST), a local interconnection network (LIN), a local area network (LAN), and other appropriate connections such as Ethernet.

The power supply 102 provides power to one or more of the controller 101, the storage 103, the output 104, the battery information input 106, the ECU information input 107, and the communication device 108 of the apparatus for detecting battery drain 100. The power supply 102 may include one or more from among a battery, an outlet, a capacitor, a solar energy cell, a generator, a wind energy device, an alternator, etc.

The storage 103 is configured for storing information and retrieving information used by the apparatus for detecting battery drain 100. The storage 103 may be controlled by the controller 101 to store and retrieve information such as one or more from among vehicle parametric data such as critical data parameters of an ECU, fleet information, battery drain information, current draw information, ECU activity information and ECU snapshot information. The storage 103 may also include the computer instructions configured to be executed by a processor to perform the functions of the apparatus for detecting battery drain 100.

The information on critical data parameters may include at least one from among information on a power mode state, information on a time synch message, information on diagnostic trouble codes (DTC) with a timestamp logged within ECU, information on a shutdown inhibit notification with ECU for active software functions, information on memory faults, information on input/output logical states received by microprocessor, information on battery voltage measured at an ECU, information on temperature at an ECU, vehicle identification information, and information on battery voltage, current or charge. Accordingly to one example, information on a power mode state may include information on a vehicle ignition system indicating if battery charging is active and that if battery charging is active a battery discharge event may not be of concern.

The fleet information may include one or more from among battery drain information, driver behavior information, vehicle age information, and environmental information, of other vehicles in a fleet of vehicles. For example, the battery drain information may include information derived from intelligent battery service data. Intelligent battery service may provide functionality to determine within the vehicle that a battery drain event has occurred (after recovery). The determination serves as a trigger to offload data for isolating the ECUs that may be responsible for the drain. This intelligent battery service may notify a controller or server to initiate an analysis for identifying the cause of a battery drain event after recovery.

The current draw information may include information on a current draw of vehicle derived from intelligent battery service data. The battery drain information may include one or more from among information on an ECU where a battery discharge is detected, information on whether a cause of a detected battery drain of a vehicle is external or internal to an ECU, and information identifying a cause of a battery drain. The information on the activity of the identified at least one ECU may include current and historical activity of the identified at least one ECU.

The ECU snapshot information may include a snapshot of information from the ECU memory or of network activity that is stored at a time when the fault was active or battery drain is detected. This information may be stored at an ECU or taken from an ECU and stored at a central location such as a server or computer that analyzes the information to detect a battery drain event and the source of the battery drain.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), nonvolatile memory, EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus for detecting battery drain 100. The output 104 may include one or more from among a speaker, a display, a transparent display, a centrally-located display, a head up display, a windshield display, a haptic feedback device, a vibration device, a tactile feedback device, a tap-feedback device, a holographic display, an instrument light, an indicator light, etc. The output 104 may output a notification including one or more from among an audible notification, a light notification, and a display notification. The notification or output may include information regarding one or more ECUs that are causing battery drain. Moreover, the notification or output may also include information indicating whether the fault is internal to an ECU or external to an ECU and/or the root cause of the fault. According to one example, the output 104 may also output vehicle bus wakeup or mechanical I/O control outputs associated with activation of vehicle components.

The battery information input 106 is configured to provide battery information to the apparatus for detecting battery drain 100. The battery information input 106 may receive information on battery voltage, current, charge or state of a vehicle battery, and/r fault information indicating fault events local to ECU's hardware and/or connector circuits.

The ECU information input 107 is configured to receive information from an ECU. For example, the ECU information input 107 may receive critical parameter data including one or more from among information on a power mode state, information on a time synch message, information on a diagnostic trouble code with a timestamp logged within ECU, information on a shutdown inhibit notification with ECU for active software functions, information on memory faults, information on input/output logical states received by microprocessor, information on battery voltage measured at an ECU, information on temperature at an ECU, vehicle identification information, and information on battery voltage, current or charge.

The ECU information input 107 provides information that may be received by the controller 101 via a bus, storage 103 or communication device 108. The ECU information input 107 may provide data via continuous monitoring of one or more ECU's, triggers (e.g., a battery drain event), scheduled offloading of data. According to an example, a control algorithm within each ECU performs the startup monitoring and shutdown monitoring function that mandates all wakeup events and sources to be logged for future analysis. In addition, a shutdown manager may control all functions within an ECU in order to continue ECU operation after a vehicle power mode off condition has been reached.

The communication device 108 may be used by the apparatus for detecting battery drain 100 to communicate with various types of external apparatuses according to various communication methods. The communication device 108 may be used to send/receive one or more from among battery drain information, fleet information, critical data parameters, current draw information, ECU activity information, and ECU snapshot information to/from the controller 101 of the apparatus for detecting battery drain 100.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, EVDO, CDMA, GPRS, EDGE or ZigBee.

The controller 101 of the apparatus for detecting battery drain 100 may also be configured to collect critical data parameters from a plurality of electronic controller units (ECUs); identify at least one ECU that is active from among the plurality of ECUs based on the critical data parameters and store ECU snapshot data of the identified at least one ECU; determine an activity of the identified at least one ECU based on the critical data parameters; determine battery drain information based on at least one from among the ECU snapshot data, the critical data parameters, the activity of the identified at least one ECU, current draw information and fleet information; and output determined battery drain information.

The controller 101 of the apparatus for detecting battery drain 100 may be configured to start normal battery usage range timer after determining that a power mode has transitioned to a power off setting (e.g., a mode to allow all ECUs within the vehicle to begin their shutdown process to enter a low power state based on design intent, a mode in which the engine is not running, a or mode in which battery charging is stopped, etc.), and in response to the normal battery usage timer elapsing, performing one or more of: storing the critical data parameters snapshot for an ECU from among the plurality of ECUs in response to determining that the ECU wakeup is active; storing the critical data parameters snapshot for an ECU and decrementing a shutdown sequence monitor counter in response to determining that a shutdown prevention event for the ECU is active; and restarting a normal battery usage timer in response to the shutdown sequence monitor counter being greater than zero. The restarting the normal battery usage timer in response to the shutdown sequence monitor counter being greater than zero may performed to allow storing of multiple samples of critical data parameters from ECUs that remain active and to determine progression of battery discharge condition that could result in a batter drain event.

The battery usage timer indicates a predetermined period of time after the vehicle power off condition has reached in which a current draw above a threshold is expected or normal. In other words, if current draw remains above threshold after predetermined period of time, then battery drain event is likely. For example, it may be expected that the battery is to provide power or remain for a predetermined period of time after an ignition is off or a power down event. However, if the battery remains active or power draw continues after that predetermined period of time, then it is possible that a battery drain event has occurred. To minimize the data storage requirements, multiple samples of critical data parameters may be taken based on the battery usage timer to determine progression of ECUs remaining active and their internal parameters resulting in battery drain events.

The controller 101 of the apparatus for detecting battery drain 100 may also be configured to store the ECU snapshot data of first time stamped events of the identified at least one ECU, if the critical data parameters of the identified ECU indicate the identified at least one ECU is awake longer a predetermined threshold time; and store the ECU snapshot data of second time stamped events of the identified at least one ECU if the critical data parameters of the identified ECU indicate active wakeups are present in the ECU or a wakeup frequency is more than a predetermined threshold wakeup frequency.

The first time stamped events may include at least one from among a function preventing ECU shutdown and information on a root cause of prevention of ECU shutdown. For example, the first time stamped events may be events evaluated by an ECU to determine shutdown prevention events that are active and log associated information. The second time stamped events may include at least one from among information on a wakeup event source and information on a root cause of wakeup event.

Figure 2:
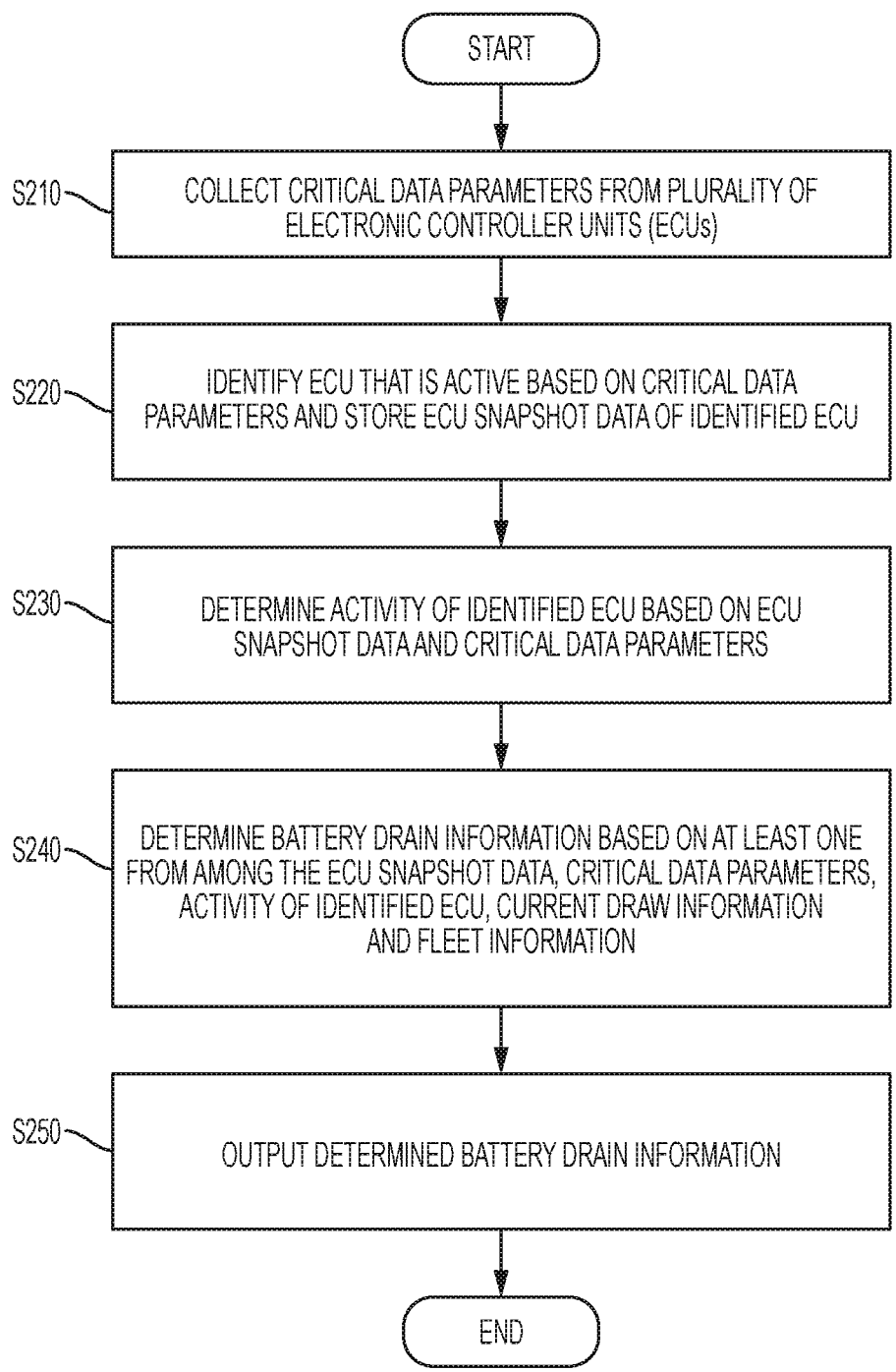
FIG. 2 shows a flowchart for a method for detecting battery drain according to an exemplary embodiment.

FIG. 2 shows a flowchart for a method for detecting battery drain according to an exemplary embodiment. The method of FIG. 2 may be performed by the apparatus for detecting battery drain 100 or may be encoded into a computer readable medium as instructions that are executable by a computer to perform the method.

Referring to FIG. 2, critical data parameters from a plurality of electronic controller units (ECUs) are collected in operation S210. In one examples, the critical data parameters may be collected by reading messages sent to/from an ECU or by reading a memory of an ECU. Based on the critical data parameters at least one ECU that is active from among the plurality of ECUs may be identified in operation S220 and ECU snapshot data of the identified at least one ECU may be stored and evaluated.

In operation S230, an activity of the identified at least one ECU may be determined based on the ECU snapshot data and the critical data parameters. Battery drain information may be determined based on one or more from among the ECU snapshot data, the critical data parameters, the activity of the identified at least one ECU, current draw information and fleet information in operation S240. The determined battery drain information may be output in operation S250. The battery drain information may be provided to diagnostic tool or other computing device over a wireless or wired network or other type of connection, or may be displayed on a display.

Figure 3:
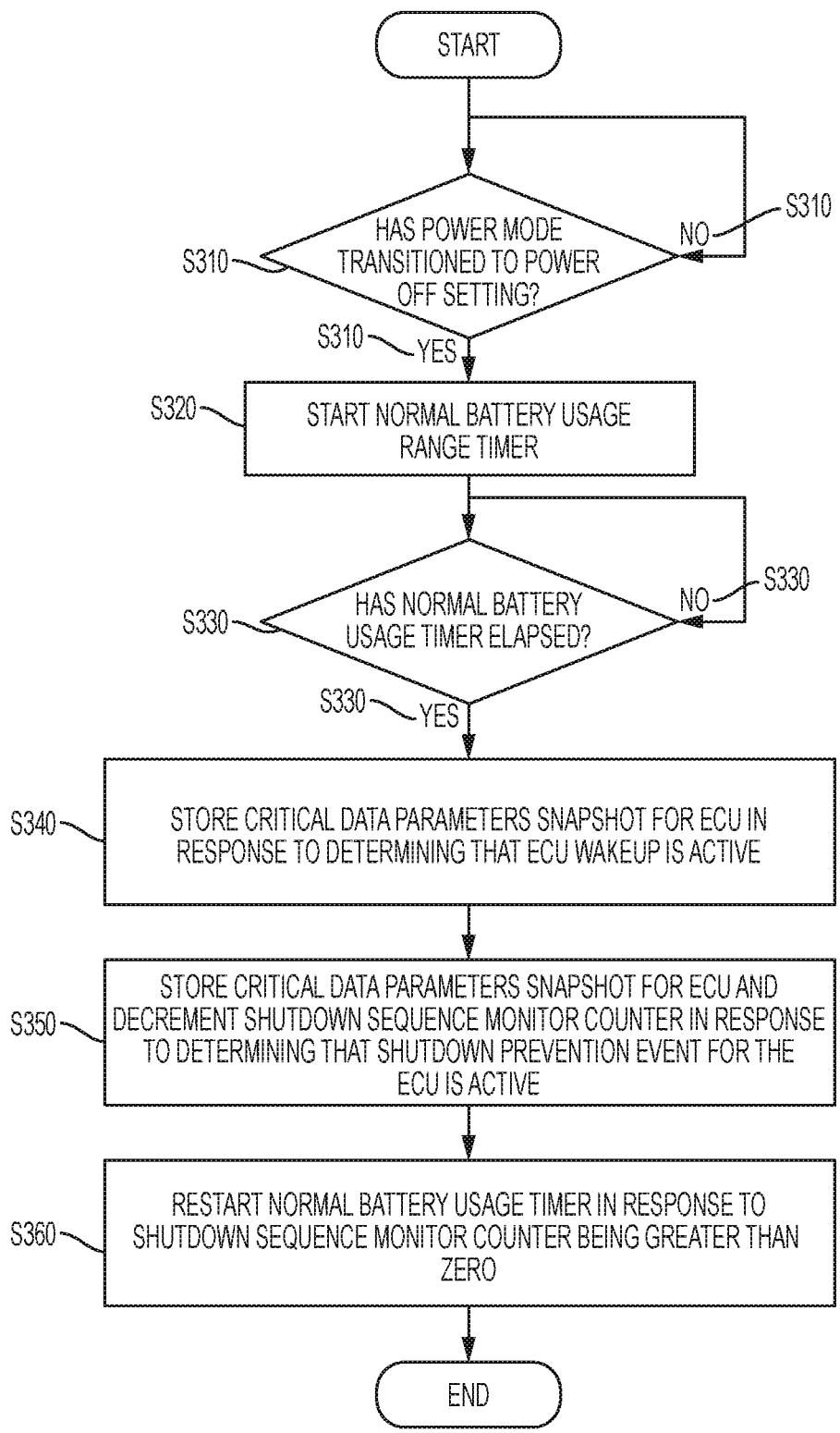
FIG. 3 shows a flowchart for a method for collecting information to detect battery drain according to an aspect of an exemplary embodiment.

FIG. 3 shows a flowchart for a method for collecting information to detect battery drain according to an aspect of an exemplary embodiment. The method of FIG. 3 may be performed by the apparatus for detecting battery drain 100 or may be encoded into a computer readable medium as instructions that are executable by a computer to perform the method.

Referring to FIG. 3, it is determined whether a power mode has transitioned to a power off setting in operation S310. If it is determined that the power mode has transitioned into power off setting (operation S310—Yes), a normal battery usage range timer is started in operation S320.

In operation S330, it is determined whether the normal battery usage timer has elapsed. In response to the normal battery usage timer elapsing (operation S330—Yes), the critical data parameters snapshot for an ECU from among the plurality of ECUs is stored in response to determining that the ECU wakeup is active in operation S340. A critical data parameters snapshot for an ECU is stored and a shutdown sequence monitor counter is decremented in response to determining that a shutdown prevention event for the ECU is active in operation S350. In operation S360, a normal battery usage timer is restarted in response to the shutdown sequence monitor counter being greater than zero.

Figure 4:
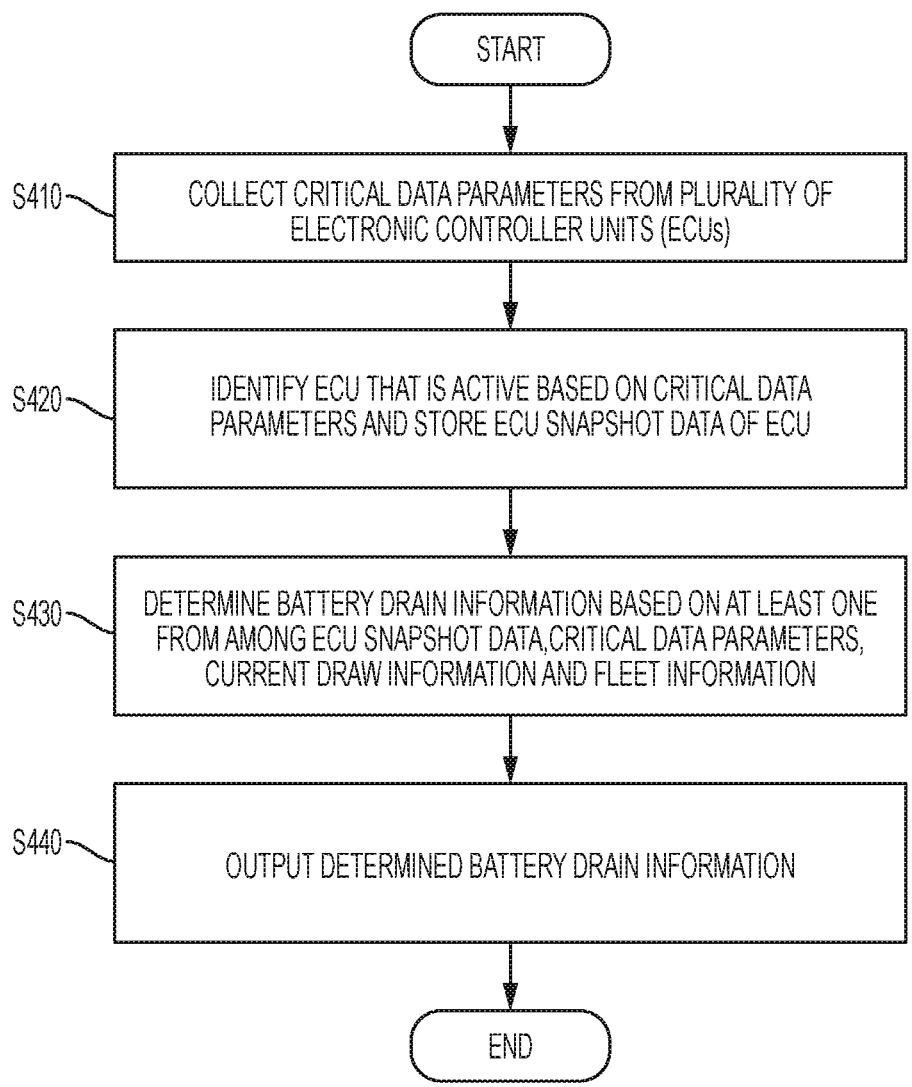
FIG. 4 shows a flowchart for a method for detecting battery drain according to an to an exemplary embodiment.

FIG. 4 shows a flowchart for a method for detecting battery drain according to an aspect of an exemplary embodiment. The method of FIG. 4 may be performed by the apparatus for detecting battery drain 100 or may be encoded into a computer readable medium as instructions that are executable by a computer to perform the method.

Referring to FIG. 4, critical data parameters from a plurality of electronic controller units (ECUs) are collected in operation 410. In one examples, the critical data parameters may be collected by reading messages sent to/from an ECU or by reading a memory of an ECU. Based on the critical data parameters at least one ECU that is active from among the plurality of ECUs may be identified and ECU snapshot data of the identified at least one ECU may be stored in operation S420.

In operation S430, battery drain information may be determined based on one or more from among the ECU snapshot data, the critical data parameters, current draw information and fleet information. The determined battery drain information may be output in operation S440. The output battery drain information may be provided to diagnostic tool or other computing device over a wireless or wired network or other type of connection, or may be displayed on a display.

Figure 5:
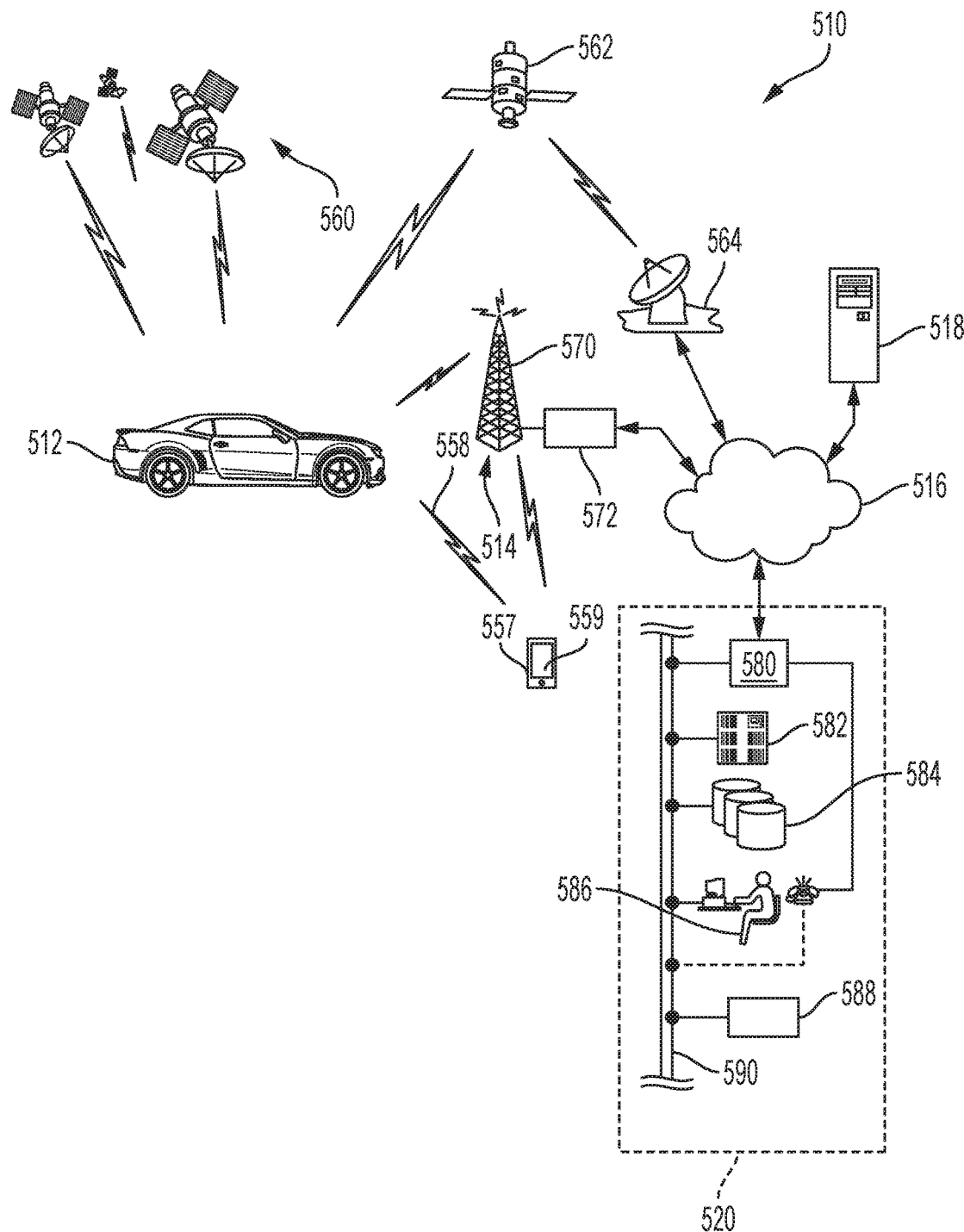
FIG. 5 shows an illustration of an operating environment that comprises a mobile vehicle communications system and that can be used to collect information to implement the apparatus and the method that detect battery drain.

FIG. 5 shows an illustration of an operating environment that comprises a mobile vehicle communications system 510 and that can be used to implement the apparatus and the method that detect battery drain disclosed herein.

Referring to FIG. 5, an operating environment that comprises a mobile vehicle communications system 510 and that can be used to implement apparatus and the method for detecting battery drain is shown. Communications system 510 may include one or more from among a vehicle 512, one or more wireless carrier systems 514, a land communications network 516, a computer 518, and a call center 520. It should be understood that the disclosed apparatus and the method for detecting battery drain can be used with any number of different systems and is not specifically limited to the operating environment shown here. The following paragraphs simply provide a brief overview of one such communications system 510; however, other systems not shown here could employ the disclosed apparatus and the method for detecting battery drain as well.

Vehicle 512 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. One or more elements of apparatus for detecting battery drain 100 shown in FIG. 1 may be incorporated into vehicle 512.

One of the networked devices that can communicate with the communication device 108 of FIG. 1 is a wireless device, such as a smart phone 557. The smart phone 557 can include computer processing capability, a transceiver capable of communicating using a short-range wireless protocol 558, and a visual smart phone display 559. In some implementations, the smart phone display 559 also includes a touch-screen graphical user interface and/or a GPS module capable of receiving GPS satellite signals and generating GPS coordinates based on those signals. One or more elements of apparatus for detecting a hazardous vehicle 100 shown in FIG. 1 may be incorporated into smart phone 557.

The GPS module of the communication device 108 may receive radio signals from a constellation 560 of GPS satellites, recognize a location of a vehicle based on the on board map details or by a point of interest or a landmark. From these signals, the communication device 108 can determine vehicle position that is used for providing navigation and other position-related services to the vehicle driver and also to contribute to critical data parameter logging to use GPS information for analyses of vehicle battery drain events. Navigation information can be presented by the output 104 (or other display within the vehicle) or can be presented verbally such as is done when supplying turn-by-turn navigation. The navigation services can be provided using a dedicated in-vehicle navigation module or some or all navigation services can be done via the communication device 108. Position information may be sent to a remote location for purposes of providing the vehicle with navigation maps, map annotations (points of interest, restaurants, etc.), route calculations, and the like. The position information can be supplied to call center 520 or other remote computer system, such as computer 518, for other purposes, such as fleet management. Moreover, new or updated map data can be downloaded by the communication device from the call center 520.

The vehicle 512 may include vehicle system modules (VSMs) in the form of electronic hardware components that are located throughout the vehicle and typically receive input from one or more sensors and use the sensed input to perform diagnostic, monitoring, control, reporting and/or other functions. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions. As examples, one VSM can be an ECU that controls various aspects of engine operation such as fuel ignition and ignition timing, another VSM can be an external sensor module configured to receive information from external sensors such as cameras, radars, LIDARs, and lasers, another VSM can be a powertrain control module that regulates operation of one or more components of the vehicle powertrain, and another VSM can be a body control module that governs various electrical components located throughout the vehicle, like the vehicle's power door locks and headlights. According to an exemplary embodiment, the electronic controller unit is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 512, as numerous others are also available.

Wireless carrier system 514 may be a cellular telephone system that includes a plurality of cell towers 570 (only one shown), one or more mobile switching centers (MSCs) 572, as well as any other networking components required to connect wireless carrier system 514 with land network 516. Each cell tower 570 includes sending and receiving antennas and a base station, with the base stations from different cell towers being connected to the MSC 572 either directly or via intermediary equipment such as a base station controller. Cellular system 514 can implement any suitable communications technology, including for example, analog technologies such as AMPS, or the newer digital technologies such as CDMA (e.g., CDMA2000 or 1×EV-DO) or GSM/GPRS (e.g., 4G LTE). As will be appreciated by those skilled in the art, various cell tower/base station/MSC arrangements are possible and could be used with wireless system 514. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 514, a different wireless carrier system in the form of satellite communication can be used to provide uni-directional or bi-directional communication with the vehicle. This can be done using one or more communication satellites 562 and an uplink transmitting station 564. Uni-directional communication can be, for example, satellite radio services, wherein programming content (news, music, etc.) is received by transmitting station 564, packaged for upload, and then sent to the satellite 562, which broadcasts the programming to subscribers. Bi-directional communication can be, for example, satellite telephony services using satellite 562 to relay telephone communications between the vehicle 512 and station 564. If used, this satellite telephony can be utilized either in addition to or in lieu of wireless carrier system 514.

Land network 516 may be a land-based telecommunications network that is connected to one or more landline telephones and connects wireless carrier system 514 to call center 520. For example, land network 516 may include a public switched telephone network (PSTN) such as that used to provide hardwired telephony, packet-switched data communications, and the Internet infrastructure. One or more segments of land network 516 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 520 need not be connected via land network 516, but could include wireless telephony equipment so that it can communicate directly with a wireless network, such as wireless carrier system 514.

Computer 518 can be one of a number of computers accessible via a private or public network such as the Internet. Each such computer 518 can be used for one or more purposes, such as a web server accessible by the vehicle via the communication device 108 and wireless carrier 514. Other such accessible computers 518 can be, for example: a service center computer where diagnostic information and other vehicle data can be uploaded from the vehicle via the communication device 108; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 512 or call center 520, or both. A computer 518 can also be used for providing Internet connectivity such as DNS services or as a network address server that uses DHCP or other suitable protocol to assign an IP address to the vehicle 512.

Call center 520 is designed to provide the vehicle electronics with a number of different system back-end functions and, according to the exemplary embodiment shown here, generally includes one or more switches 580, servers 582, databases 584, live advisors 586, as well as an automated voice response system (VRS) 588. These various call center components may be coupled to one another via a wired or wireless local area network 590. Switch 580, which can be a private branch exchange (PBX) switch, routes incoming signals so that voice transmissions are usually sent to either the live adviser 586 by regular phone or to the automated voice response system 588 using VoIP. The live advisor phone can also use VoIP as indicated by the broken line in FIG. 5. VoIP and other data communication through the switch 580 is implemented via a modem (not shown) connected between the switch 580 and network 590. Data transmissions are passed via the modem to server 582 and/or database 584. Database 584 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 520 using live advisor 586, it will be appreciated that the call center can instead utilize VRS 588 as an automated advisor or, a combination of VRS 588 and the live advisor 586 can be used.

The mobile vehicle communications system 510 may be used to transmit ECU activity information, battery drain information, information on critical data parameters, current draw information, battery drain information, and ECU activity information from a fleet of vehicles to a computer or servers. The transmitted information may be analyzed by a computer, server or analyst, to determine battery drain in a vehicle and may be compared against other vehicles within the fleet that do not experience battery drain events and also to provide a point of reference against expected/normal mode behavior. Moreover, an assistant at a call center may use the information to determine battery drain and may provide advice about corrective measures to address the battery drain.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for detecting battery drain, the method comprising:
   collecting critical data parameters from a plurality of electronic controller units (ECUs);
   identifying at least one ECU that is active from among the plurality of ECUs based on the critical data parameters and storing ECU snapshot data of the identified at least one ECU;
   determining an activity of the identified at least one ECU based on the ECU snapshot data and the critical data parameters;
   determining battery drain information based on at least one from among the ECU snapshot data, the critical data parameters, the activity of the identified at least one ECU, current draw information and fleet information; and
   outputting determined battery drain information,
   wherein the storing ECU snapshot data of the identified at least one ECU comprises:
      storing the ECU snapshot data of first time stamped events of the identified at least one ECU, if the critical data parameters of the identified ECU indicate the identified at least one ECU is awake longer than a predetermined threshold time; and
      storing the ECU snapshot data of second time stamped events of the identified at least one ECU if the critical data parameters of the identified ECU indicate active wakeups are present in the identified ECU or a wakeup frequency is more than a predetermined threshold wakeup frequency,
   wherein the first time stamped events include at least one from among a function preventing ECU shutdown and information on a root cause of prevention of ECU shutdown, and
   wherein the second time stamped events include at least one from among information on a wakeup event source and information on a root cause of wakeup event.

2. The method of claim 1, wherein the collecting the critical data parameters comprises:

starting normal battery usage timer after determining that a power mode has transitioned to a power off setting; and in response to the normal battery usage timer elapsing, performing:
storing the critical data parameters snapshot for an ECU from among the plurality of ECUs in response to determining that an ECU wakeup condition is active;
storing the critical data parameters snapshot for the ECU and decrementing a shutdown sequence monitor counter, in response to determining that a shutdown prevention event for the ECU is active; and
restarting the normal battery usage timer in response to the shutdown sequence monitor counter being greater than zero.

3. The method of claim 2, wherein the critical data parameters comprise at least one from among information on a power mode state, information on a time synch message, information on a diagnostic trouble code with a timestamp logged within ECU, information on a shutdown inhibit notification within an ECU for active software functions, information on memory faults, information on input/output logical states received by microprocessor, information on battery voltage measured at an ECU, information on temperature at an ECU, vehicle identification information, and information on battery voltage, current or charge.

4. The method of claim 1, wherein the fleet information comprises at least one from among battery drain information, driver behavior information, vehicle age information, and environmental information, of other vehicles in a fleet of vehicles.

5. The method of claim 1, wherein the current draw information comprises information on a current draw of vehicle derived from intelligent battery service data.

6. The method of claim 1, wherein the activity of the identified at least one ECU comprises current and historical activity of the identified at least one ECU.

7. The method of claim 1, wherein the battery drain information comprises at least one from among information on an ECU where a battery discharge is detected, information on whether a cause of a detected battery drain of a vehicle is external or internal to an ECU, and information identifying a cause of a battery drain.

8. A non-transitory computer readable medium comprising computer executable instructions executable by a processor to perform the method of claim 1.

9. An apparatus for detecting battery drain, the apparatus comprising:
at least one memory comprising computer executable instructions; and
at least one processor configured to read and execute the computer executable instructions, the computer executable instructions causing the at least one processor to:
collect critical data parameters from a plurality of electronic controller units (ECUs);
identify at least one ECU that is active from among the plurality of ECUs based on the critical data parameters and store ECU snapshot data of the identified at least one ECU;
determine an activity of the identified at least one ECU based on the critical data parameters;
determine battery drain information based on at least one from among the ECU snapshot data, the critical data parameters, the activity of the identified at least one ECU, current draw information and fleet information; and output determined battery drain information,
wherein the computer executable instructions further causing the at least one processor to store ECU snapshot data of the identified at least one ECU by:
storing the ECU snapshot data of first time stamped events of the identified at least one ECU, if the critical data parameters of the identified ECU indicate the identified at least one ECU is awake longer than a predetermined threshold time; and
storing the ECU snapshot data of second time stamped events of the identified at least one ECU if the critical data parameters of the identified ECU indicate active wakeups are present in the identified at least one ECU or a wakeup frequency is more than a predetermined threshold wakeup frequency,
wherein the first time stamped events include at least one from among a function preventing ECU shutdown and information on a root cause of prevention of ECU shutdown, and
wherein the second time stamped events include at least one from among information on a wakeup event source and information on a root cause of wakeup event.

10. The apparatus of claim 9, wherein the computer executable instructions further causing the at least one processor to collect the critical data parameters by:
starting normal battery usage timer after determining that a power mode has transitioned to a power off setting; and
in response to the normal battery usage timer elapsing, performing:
storing the critical data parameters snapshot for an ECU from among the plurality of ECUs in response to determining that an ECU wakeup condition is active;
storing the critical data parameters snapshot for an ECU and decrementing a shutdown sequence monitor counter, in response to determining that a shutdown prevention event for the ECU is active; and
restarting the normal battery usage timer in response to the shutdown sequence monitor counter being greater than zero.

11. The apparatus of claim 10, wherein the critical data parameters comprise at least one from among information on a power mode state, information on a time synch message, information on a diagnostic trouble code with a timestamp logged within ECU, information on a shutdown inhibit notification within an ECU for active software functions, information on memory faults, information on input/output logical states received by microprocessor, information on battery voltage measured at an ECU, information on temperature at an ECU, vehicle identification information, and information on battery voltage, current or charge.

12. The apparatus of claim 9, wherein the fleet information comprises at least one from among battery drain information, driver behavior information, vehicle age information, and environmental information, of other vehicles in a fleet of vehicles.

13. The apparatus of claim 9, wherein the current draw information comprises information on a current draw of vehicle derived from intelligent battery service data.

14. The apparatus of claim 9, wherein the activity of the identified at least one ECU comprises current and historical activity of the identified at least one ECU.

15. The apparatus of claim 9, wherein the battery drain information comprises at least one from among information on an ECU where a battery discharge is detected, information on whether a cause of a detected battery drain of a vehicle is external or internal to an ECU, and information identifying a cause of a battery drain.

\* \* \* \* \*